US010422482B2

(12) United States Patent
Bernard et al.

(10) Patent No.: US 10,422,482 B2
(45) Date of Patent: Sep. 24, 2019

(54) DEVICE FOR PROVIDING FLUID UNDER PRESSURE

(71) Applicant: L'Air Liquide, Société Anonyme pour l'Etude et l'Exploitation des Procédés Georges Claude, Paris (FR)

(72) Inventors: Philippe Bernard, Goincourt (FR); Patrick Bacot, Meudon (FR); David Laurent, Le Perray en Yvelines (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 15/766,202

(22) PCT Filed: Sep. 15, 2016

(86) PCT No.: PCT/FR2016/052334
§ 371 (c)(1),
(2) Date: Apr. 5, 2018

(87) PCT Pub. No.: WO2017/060579
PCT Pub. Date: Apr. 13, 2017

(65) Prior Publication Data
US 2018/0283615 A1 Oct. 4, 2018

(30) Foreign Application Priority Data
Oct. 7, 2015 (FR) ...................... 15 59527

(51) Int. Cl.
*F17C 5/00* (2006.01)
*F17C 13/04* (2006.01)
(Continued)

(52) U.S. Cl.
CPC ............... *F17C 13/02* (2013.01); *H04Q 9/00* (2013.01); *F17C 2201/056* (2013.01);
(Continued)

(58) Field of Classification Search
None
See application file for complete search history.

(56) References Cited

U.S. PATENT DOCUMENTS 8,869,845 B2 * 10/2014 Moretti .................. F17C 13/04
137/614.06
2005/0173007 A1 * 8/2005 Cannet .................... F16K 1/306
137/557
(Continued)

FOREIGN PATENT DOCUMENTS

EP  1 717 564   11/2006
EP  1 988 327   11/2008
(Continued)

OTHER PUBLICATIONS

Sigfox—bandwidth,distance,data rate,frequency,message size.modulation.applications, RF Wireless World, Downloaded Jan. 12, 2019.*
(Continued)

*Primary Examiner* — Muhammad N Edun
*Assistant Examiner* — Jerold B Murphy
(74) *Attorney, Agent, or Firm* — Elwood L. Haynes

(57) ABSTRACT

A device for supplying pressurized fluid including a pressurized fluid cylinder, at least one first tap connected to the pressurized fluid cylinder, the tap including an internal fluid circuit including an isolation valve, the device including an electronic apparatus for the wireless remote communication of data via electromagnetic waves, the electronic communication apparatus including a communication element designed to communicate wirelessly using at least one of the following frequency-modulation and/or phase-modulation low-consumption and long-range communication technologies: LoRa communication technology, communication technology from Sigfox, where the device includes a protective cap mounted on the cylinder in order to protect the
(Continued)

first tap and a second tap connected detachably to the first tap, and the electronic communication apparatus being situated either on the cylinder, on the cap, on the first tap, or on the second tap.

19 Claims, 1 Drawing Sheet

(51) Int. Cl.
*F16K 1/30* (2006.01)
*F17C 13/02* (2006.01)
*H04Q 9/00* (2006.01)

(52) U.S. Cl.
CPC .............. *F17C 2201/058* (2013.01); *F17C 2205/0326* (2013.01); *F17C 2205/0329* (2013.01); *F17C 2205/0335* (2013.01); *F17C 2205/0338* (2013.01); *F17C 2205/0373* (2013.01); *F17C 2205/0394* (2013.01); *F17C 2205/055* (2013.01); *F17C 2205/057* (2013.01); *F17C 2205/058* (2013.01); *F17C 2223/0123* (2013.01); *F17C 2223/036* (2013.01); *F17C 2250/032* (2013.01); *F17C 2250/034* (2013.01); *F17C 2250/043* (2013.01); *F17C 2250/0482* (2013.01); *F17C 2250/0486* (2013.01); *F17C 2265/04* (2013.01); *H04Q 2209/43* (2013.01)

(56) References Cited

U.S. PATENT DOCUMENTS

| | | |
|---|---|---|
| 2006/0036515 A1 | 2/2006 | Ingalsbe et al. |
| 2006/0142974 A1 | 6/2006 | Scott et al. |
| 2008/0221808 A1 | 9/2008 | Dix et al. |
| 2009/0040049 A1* | 2/2009 | Delecourt ............... F17C 5/002 340/572.4 |
| 2017/0122497 A1* | 5/2017 | Bernard ................... F17C 13/04 |
| 2017/0202180 A1* | 7/2017 | Yang ..................... A01K 29/005 |

FOREIGN PATENT DOCUMENTS

| | | |
|---|---|---|
| EP | 2 829 786 | 1/2015 |
| EP | 2 998 636 | 3/2016 |
| EP | 2 998 637 | 3/2016 |
| FR | 3 019 623 | 10/2015 |
| FR | 3 022 972 | 1/2016 |
| GB | 2 486 018 | 6/2012 |
| WO | WO 2013 041823 | 3/2013 |

OTHER PUBLICATIONS

Written Opinion of the ISA for PCT/FR2016/052334, dated Sep. 15, 2016 (English translation).
International Search Report for corresponding PCT/FR2016/052334, dated Jan. 3, 2017.

\* cited by examiner

DEVICE FOR PROVIDING FLUID UNDER PRESSURE

CROSS REFERENCE TO RELATED APPLICATIONS

This application is a 371 of International Application PCT/FR2016/052334 filed Sep. 15, 2016, which claims priority to French Patent Application No. 1559527 filed Oct. 7, 2015, the entire contents of which are incorporated herein by reference.

BACKGROUND

The invention relates to a device for supplying pressurized fluid.

The invention relates more particularly to a device for supplying pressurized fluid, in particular pressurized gas, comprising a pressurized fluid cylinder comprising at least one first tap connected to the cylinder and comprising an internal fluid circuit including an isolation valve, the device comprising an electronic apparatus for the wireless remote communication of data via electromagnetic waves.

Gas cylinders or their components (body, head or other appliances and accessories) may be misplaced or situated in arbitrary and indeterminate locations during use thereof. Likewise, these appliances may be in an indeterminate state or configuration. For example, a gas cylinder may be sealed, full, being used, empty, in service, out of service, etc. In the same way, a component or accessory may or may not be connected to the cylinder, in service, out of use, etc. Not knowing the location and the state of these elements in real time does not make it possible to anticipate events or to optimize logistics and production.

Tracking systems exist that require specific and/or manual operations (scanning of a bar code, of an 'RFID' radio tag, use of a detector gate, etc.) in order to compile this information in a computer system. These known systems are not synchronous and do not make it possible to effectively follow the appliances in real time.

Document EP1988327A1 describes a known solution for locating cylinders and for processing data.

SUMMARY

One aim of the present invention is to mitigate all or some of the drawbacks of the prior art that are set out above.

One possible aim of the invention may be to propose an automatic or non-automatic system that enables knowledge, at any instant, of the state and the actual position of a pressurized fluid cylinder or, as the case may be, of one of its components (head, body, accessories, etc.).

To this end, the device according to the invention, which otherwise complies with the generic definition given thereof in the above preamble, is essentially characterized in that said electronic communication apparatus comprises a communication element configured to communicate wirelessly using at least one of the following frequency-modulation and/or phase-modulation low-consumption and long-range communication technologies: LoRa® communication technology, communication technology from Sigfox.

Moreover, embodiments of the invention may include one or more of the following features:

the LoRa® communication technology uses frequency hopping spread spectrum frequency modulation enabling in particular the recovery of transmitted data even when they are received with a signal-to-noise ratio of less than 0 dB, operating on set frequency bands, in particular between 433.0 and 434.79 MHz, between 863 and 870 MHz, between 902 and 928 MHz, and between 2400 and 2500 MHz, the communication technology from Sigfox uses ultra-narrow band (UNB) frequency modulation or phase modulation synthesizing frequency modulation, making it possible to obtain a high power spectral density in order to increase the signal-to-noise ratio, operating on set frequency bands, in particular between 433.0 and 434.79 MHz, between 863 and 870 MHz, between 902 and 928 MHz, and between 2400 and 2500 MHz, the device includes at least one electronic element for receiving the data transmitted wirelessly by the electronic communication apparatus, the electronic reception element being configured to determine the position of the electronic communication apparatus on the basis of the data transmitted wirelessly by the latter, the at least one electronic data reception element comprises at least one of the following: an antenna connected to a communication network, in particular a cloud communication network comprising at least one server, a cordless telephone, the electronic communication apparatus comprises at least one communication element configured to communicate wirelessly using 'Bluetooth' technology, the at least one electronic data reception element comprises a cordless telephone configured to communicate using 'Bluetooth' technology and an electronic box for wirelessly receiving and transmitting data and configured to communicate using 'Bluetooth' technology and in accordance with the LoRa® communication protocol and/or via the ultra-narrow frequency band communication network developed by Sigfox, said transceiver box being configured to receive data transmitted by the communication element using low-consumption and long-range communication technology and to convert and transfer these data to the telephone using 'Bluetooth' technology, the transceiver box is configured to receive data transmitted using 'Bluetooth' technology via the telephone and to convert and transfer these data to the communication element using low-consumption and long-range communication technology, the telephone and/or the receiver box comprises an accelerometer and/or a magnetometer, the electronic communication apparatus comprises at least one communication element configured to communicate wirelessly using 'near-field communication' ('NFC') technology and/or using 'radiofrequency identification' ('RFID') technology, the fluid supply device comprises a protective cap mounted on the cylinder in order to protect the first tap and a second tap connected detachably to the first tap, said electronic communication apparatus being situated on the cylinder and/or on the cap and/or on the first tap and/or on the second tap, the electronic communication apparatus comprises at least one first communication element configured to communicate wirelessly using 'near-field communication' ('NFC') technology and positioned on one of the following: the cylinder, the cap, the first tap, the device comprising a second communication element configured to communicate wirelessly using 'near-field communication' ('NFC') technology and positioned on a first lower end of the second tap and placed adjacent to the first communication element ('NFC') when the second tap (5) is connected to the first tap so as to enable a data exchange, the electronic communication apparatus comprises a third communication element configured to communicate wirelessly using 'near-field communication' ('NFC') technology and positioned on a second end of the second tap, which end is situated at the upper part of the second tap when the latter is connected to the first tap and the cylinder is in a vertical use position, the electronic communication apparatus comprises a first communication element configured to communicate wirelessly using 'Bluetooth' technology and positioned on the on the cylinder and/or on the cap and/or on the first tap, the electronic communication apparatus comprises a second communication element configured to communicate wirelessly using 'Bluetooth' technology and situated on the second tap, the LoRa® communication technology uses 'frequency hopping spread spectrum' ('FHSSS'), 'direct sequence spread spectrum' ('DSSS') and 'chirp spread spectrum' ('CSS') frequency modulation, the LoRa® communication technology uses sequences of $2^6$ to $2^{12}$ chirps to code a bit, enabling bit rates of between 250 bit/s and 21 900 bit/s, depending in particular on the widths of the channels that are used (typically 125, 250 and 500 kHz), the LoRa® communication technology uses a modulation in accordance with a protocol such as 'LoRaWAN', defining in particular frames with a maximum length of 250 bytes on the MAC (Medium Access Control) layer corresponding to a maximum of 242 bytes on the application layer, and providing radiated power levels of up to 30 dBm (typically, a default value of 20 dBm and a maximum value of 30 dBm on the band between 902 and 928 MHz, and a default value of 14 dBm and a maximum value of 20 dBm on the band between 863 and 870 MHz), the communication technology from Sigfox uses an ultra narrow-band frequency modulation of 100 Hz for example, at bit rates of between 100 and 1000 bit/s, used for example with protocols allowing radiated powers of up to 20 dBm and frames with a maximum length of 12 bytes on the application layer, and generally designed for the exchange, within a large cell (having a radius of the order of between a kilometer and around ten kilometers), of short messages between several thousand objects and a base station, the majority of the communications being effected on the uplink, the electronic data reception element is configured to determine the position of the electronic communication apparatus using at least one of the following technologies: trilateration, triangulation, multilateration, the telephone and/or the receiver box is configured to locate the electronic communication apparatus on the basis of the data transmitted wirelessly by the latter via radio guidance in accordance with at least one from among the following technologies: through indication of the strength of the received signal ('RSSI'='received signal strength indication'), by measuring the angle of arrival (=AoA), LoS, by measuring the time difference of arrival (='TDoA') of the signals, ToF, TWTOF or TWR, symmetrical double-sided two-way ranging (='SDS-TWR'), and NFER® technology, the second tap is equipped with an internal fluid circuit, the second tap comprising a mobile element for actuating the isolation valve of the first tap in order to control the opening or the closure of the latter the first tap, the first and the second tap comprise respective coupling elements forming a male/female quick-connection system for detachably connecting the second tap to the first tap, when the second tap is in a position in which it is connected to the first tap, the second tap is partially housed in the cap, the electronic communication apparatus is configured to send, receive or store at least one item of information from among the following: an identification of the cylinder, an item of information relating to the nature of the fluid contained in the cylinder, an item of information relating to the maximum capacity of the cylinder, an item of information relating to the amount of fluid contained in the cylinder, an item of information for identifying the owner or user of the cylinder, an item of information relating to the site of use of the cylinder, an item of information relating to the expiry date of the fluid contained in the cylinder, an item of information relating to a certification of the fluid contained in the cylinder, and a log of at least one of the preceding items of information.

The invention may also relate to any alternative device or method comprising any combination of the features above or below.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
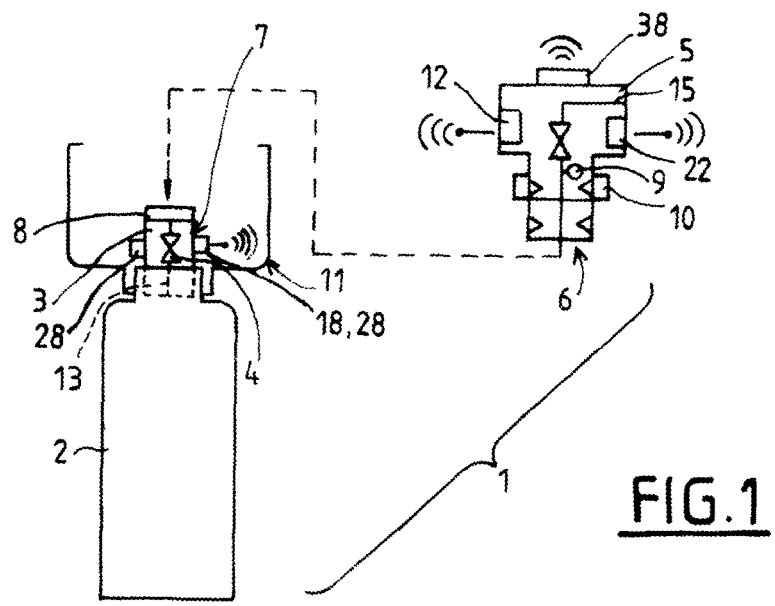
FIG. 1 shows a schematic and partial cross-sectional view illustrating a first exemplary implementation of a device for supplying fluid in a disconnected state.

The device 1 for supplying pressurized fluid, in particular pressurized gas, comprises at least one pressurized fluid cylinder 2 comprising at least a first tap 3 connected to the cylinder 2. The first tap 3 comprises an internal fluid circuit 13 including an isolation valve 4.

The device 1 comprising an electronic apparatus for the wireless remote communication of data via electromagnetic waves.

According to one advantageous particular feature, the electronic communication apparatus comprises a communication element 18 configured to communicate wirelessly using at least one of the following frequency-modulation and/or phase-modulation low-consumption and long-range communication technologies: LoRa® communication technology, communication technology from Sigfox.

The term 'low consumption' denotes a low electrical consumption, in particular for example a consumption characterized by a current at the terminals of the radio modem (transmitter and/or receiver) of a maximum of 20 mA on reception and a maximum of 200 mA on transmission.

Each technology is characterized by a modulation of data, one or more communication protocols and possibly specific physical hardware.

The modulation is the choice of waveforms carrying information.

The communication protocol is the set of rules that govern the syntax and the semantics of the data that are exchanged, the possible sequences of exchanges, and the adjustments of the physical parameters of the transmitters and receivers over time (turned on/turned off, the choice of the channel, the choice of the bit rate, etc.). It does not strictly impose the use of a particular modulation. And in practice, there are several protocols stacked on top of one another.

LoRa® technology therefore combines LoRa® modulation and protocols, in particular the LoRaWAN® protocol. Of course, other protocols may be used with the same modulation.

Sigfox technology is less dissociable; it comprises a specific modulation and a specific protocol.

This makes it possible to improve the remote exchange of information with the device, and also makes it easier to locate the latter.

In addition, local or remote knowledge of this information makes it possible to provide additional services for managing the device, for improving effectiveness for users and for optimizing the logistics chain.

Using these communication technologies also makes it possible to minimize the electrical consumption of the device.

In the non-limiting example of FIG. 1, the device for supplying pressurized fluid, in particular pressurized gas, comprises a first functional assembly including a pressurized fluid cylinder 2 equipped with an orifice in which there is fixed a fluidic connection or port, called 'first tap' 3 hereinafter. For the sake of simplicity, the term 'cylinder' used hereinafter may denote the assembly comprising the cylinder 2, the first tap 3 and the cap 11.

The first tap 3 may be a simple filling and/or extraction port equipped with a self-closing valve (with opening through mechanical actuation and/or via a gas pressure). Of course, as a variant, this first tap may be a more sophisticated tap, equipped in particular with an isolation valve controlled by a manual and/or electrical and/or pneumatic control element.

The first tap 3 is for example screwed into a tapped orifice in the cylinder 2. In other words, the first tap 3 is joined (attached) to the cylinder 2 and is not able to be removed in a use configuration.

The first tap 3 comprises, as is conventional, an internal fluid circuit 13 linked to the internal volume of the cylinder 2. The circuit includes at least one isolation valve 4. Of course, the first tap 3 may comprise any other functional element that is customary for a tap.

The device 1 includes a second tap 5 forming a physical entity that is separate from the first assembly 2, 3. This second tap 5 is also equipped with an internal fluid circuit 15. In the same way as for the first tap 3, the internal circuit 15 of the second tap 5 may include at least one isolation valve and/or a pressure regulator and/or a flow rate regulator and/or any other functional element suitable for a tap.

Figure 2:
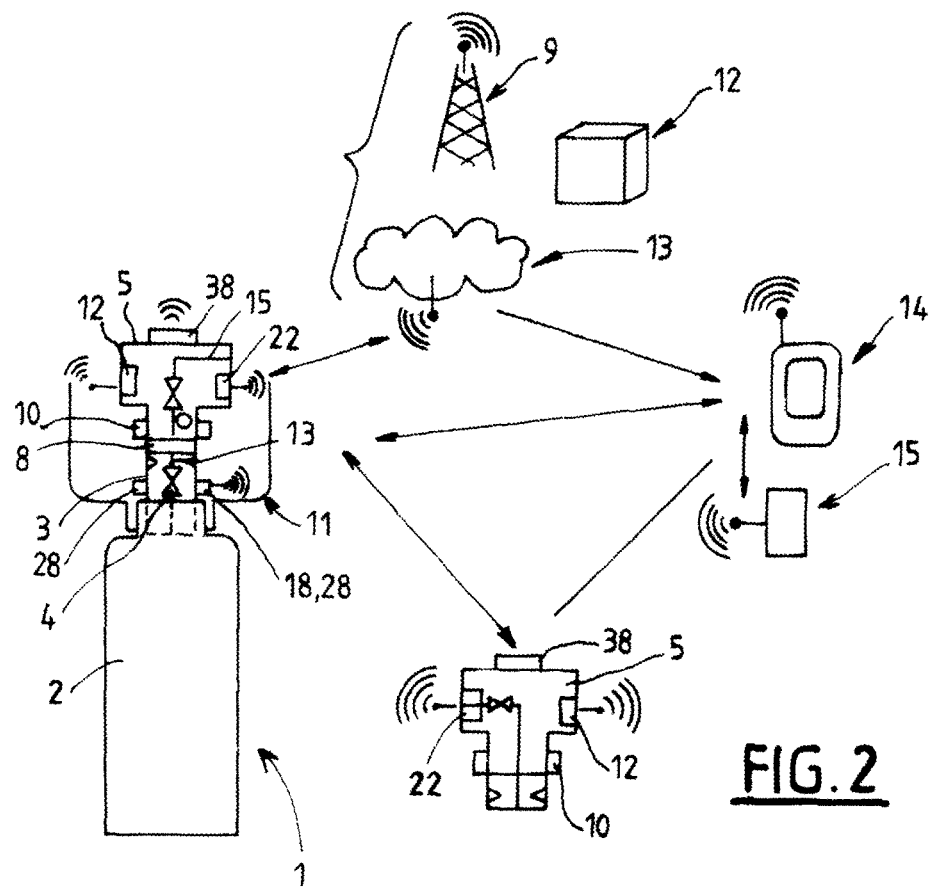
FIG. 2 shows a schematic and partial cross-sectional view of the device for supplying fluid of FIG. 1 in a state in which it is connected to its communication system and an additional separate tap.

The first tap 3 and the second tap 5 each comprise respective coupling elements 6, 7 forming a quick-connection system for detachably connecting the second tap 5 to the first tap 3 (cf. FIG. 2, the connected position). For example, the quick-connection system may comprise a system based on balls interacting with ribs, coupling claws interacting with combined recesses, or a system based on a bayonet and corresponding grooves.

The quick-connection system 6, 7 is for example of male/female type and enables the mechanical attachment of the second tap 5 to the first tap 3 in a removable manner. This locking system may comprise a manual actuation element, possibly comprising a mobile locking element requiring one or more manual actions on the part of the user.

When the second tap 5 is connected to the first tap 3, the ends of the fluid circuits 13, 15 of the two taps 3, 5 are connected in a sealtight manner, and fluid may or may not be allowed to flow between these two circuits 13, 15 depending on the opening or closure of the valve(s) of the circuit(s) 13, 15.

To this end, the internal circuit 15 of the second tap 5 may include a pressure sensor 9 in the circuit 15, in particular in order to measure the pressure in the cylinder 2 when the circuit 15 of the second tap is fluidically connected to the inside of the cylinder 2 via the first tap 3.

The cylinder 2 equipped with its first tap 3 and with its cap 11 thus includes a communication element 18 that is configured to communicate wirelessly using the abovementioned low-consumption and long-range communication technology. This enables the exchange of data over ranges of up to 15 km, for example.

For example, this communication element 18 may comprise a microcomputer, an antenna, a power supply battery, one or more input/output ports, and possibly an information display screen. In particular, this communication element 18 may incorporate suitable components marketed by Semtech (LoRa® technology) and/or Sigfox, such as the following radiofrequency transceivers: 'transceivers' SX1272, SX1273, SX1276 or SX1280 from Semtech for LoRa® technology. 'transceiver' 'SI868-25MW' from 'Adeunis RF', 'TD1202 Module' from 'Telecom Design' for Sigfox technology.

Use may generally be made of any radio module capable of housing the logic layers shaping the signal in accordance with the specifications of the technology in question.

Likewise, the second tap 5 preferably also includes such a communication element 12 configured to communicate wirelessly using the abovementioned low-consumption and long-range communication technology. This is particularly advantageous when this second tap 5 is able to be removed from the cylinder 2 and is able to be moved independently thereof and is able to be connected to another cylinder 2 of the same type.

The device 1 preferably comprises or uses at least one electronic element for receiving (and, as the case may be, for transmitting) the data transmitted by the electronic communication apparatus of the cylinder and/or the second cap 5.

This electronic reception element is configured in particular to collect data relating to the cylinder 2 and determine the position of the electronic communication apparatus 18, 12 on the basis of the data transmitted wirelessly by the latter.

The electronic data reception element may in particular be configured to determine the position of the electronic communication apparatus using at least one of the following technologies: trilateration, triangulation, multilateration.

In other words, low-consumption and long-range communication technology is used to locate the mobile entities (the cylinder 2 with the first tap 3, on the one hand, and the second cap 5, on the other hand, in particular if the latter has been separated therefrom).

As illustrated schematically in FIG. 2, the at least one electronic data reception element may comprise at least one of the following: an antenna 9 connected to a communication network 12, 13 (in particular the Internet), in particular a cloud communication network comprising at least one server, a cordless telephone 14, a data reception (and, as the case may be, transmission) box, a computer, or any other suitable apparatus.

The electronic communication apparatus preferably also comprises at least one communication element 28 configured to communicate wirelessly using 'Bluetooth' technology. This Bluetooth communication element 28 is preferably incorporated into the cylinder 2 or into the cap 11 or on the first tap 3. This additional communication element is provided for shorter-range communication (typically between 0 and 100 m, in particular 30 to 100 m).

Also preferably, the second tap 5 also includes such a communication element 22 of Bluetooth type.

Also preferably, the electronic communication apparatus comprises at least one communication element 38 configured to communicate wirelessly using 'near-field communication' ('NFC') technology and/or using 'radiofrequency identification' ('RFID') technology.

More precisely, in the example shown in the figures, a first communication element 8, configured to communicate wirelessly using 'near-field communication' ('NFC') technology, is positioned on one of the following: the cylinder 2, the cap 11, the first tap 3.

This communication element 8 of NFC type is situated on the upper part when the cylinder 2 is in a vertical use position, in particular on the upper part of the cap 11.

The device 1 comprises a second communication element 10 configured to communicate wirelessly using 'near-field communication' ('NFC') technology and positioned on a first lower end of the second tap 5. This second communication element 10 is arranged so as to be placed adjacent to the first communication element 38 ('NFC') of the cylinder 2 when the second tap 5 is connected to the first tap 2 in order to exchange data. This communication system enables the exchange of information between the cylinder 2 and the second tap 5 connected thereto. This communication system makes it possible in particular to wake/activate all or some of the electrical/electronic apparatuses or to put them into standby mode, depending on whether or not the second tap 5 is connected to the first tap 3.

The electronic communication apparatus preferably comprises a third communication element 38 configured to communicate wirelessly using 'near-field communication' ('NFC') technology. The latter is preferably positioned on a second end of the second tap 5, which end is situated on the upper part of the second tap 5 when the latter is connected to the first tap 3 and the cylinder 2 is in a vertical use position.

To receive and, as the case may be, to transmit data to the cylinder 2 and/or the second tap 5, the device may also include a cordless telephone 14 ('smartphone') configured to communicate using 'Bluetooth' and 'NFC' technology.

Likewise, the device may include a wireless data transceiver box 15, such as a portable electronic terminal configured (programmed) to communicate using 'Bluetooth' technology (and possibly 'NFC' technology) and also in accordance with the LoRa® communication protocol and/or via the ultra-narrow frequency band communication network developed by Sigfox.

In this way, said transceiver box 15 may be configured to receive data transmitted over a long range by the communication element 8 using low-consumption and long-range communication technology, and to convert and transfer these data locally to the telephone 14 using 'Bluetooth' technology.

Likewise, the telephone 14 (and possibly the box 15) may also exchange data with the cylinder 2, 3 and the second tap 5 via the NFC communication elements (by bringing the telephone or the like close to the third 'NFC' communication element 38).

The telephone 14 and/or the receiver box 5 may also be configured to locate the electronic communication apparatus (and therefore the cylinder 2 and/or the second tap 5) on the basis of the data locally transmitted wirelessly by the latter. In particular, the transfer of data via the medium-range elements 28, 22 (Bluetooth) may be used to locate the cylinder 2 and/or the second cap 5.

In particular, this location may be used to guide a user for the purpose of finding these elements 2, 5.

For example, it is possible to use radio guidance in accordance with at least one of the following technologies: through indication of the received signal strength:

'RSSI'='Received Signal Strength Indication', by measuring the angle of arrival (='AoA'), LoS (='Line of Sight'. This is defined as being a situation where there is a rectilinear path without obstacles between the transmitter and the receiver).

by measuring the time difference of arrival ('=TDoA') of the signals,

ToF (='time of flight': the receiver records the time taken by the waves to travel from the transmitter to the receiver, for example by inserting the precise instant of transmission into the message and by comparing it with the precise instant of reception). By dividing the time of flight by the speed of the waves (a priori, the speed of light in a vacuum if the path taken is essentially through the air), the total distance traveled by the waves is obtained. If it is assumed that the only waves received by the receiver have traveled on a straight line from the transmitter, what is obtained is the radius of the circle centered on the receiver on which the transmitter is situated. By combining the item of data from a plurality of circles, it is possible to locate the transmitter.

TW-TOF='two-way time of flight',

TWR='two-way ranging' (estimation of the outward-return distance). As previously, it is the transmitter that may record the time of flight of a signal that it transmits and that is returned to it by a transceiver (this returning is either considered to be instantaneous, or it is necessary to deduce the transceiver processing time from the recorded time). It is therefore the initiator of the procedure (the transmitter) in this case that knows its distance to the transceiver, in contrast to the ToF in which it is the receiver that knows its distance to the initiator (the transmitter).

NFER® technology, nLOS: non-line of sight,

Specifically, this data transmission architecture makes it possible to define a three-dimensional reference frame (altitude and coordinates on a plane or a map) or a relative reference frame (distance, direction, height or height difference) with respect to another point. This system may be implemented in real time (indoors or outdoors) and advantageously replaces the known GPS, RFID, etc. systems.

This makes it possible to measure and collect any information regarding the state of the cylinder 2 or of the tap (in particular via a pressure sensor). This information may be communicated and processed in real time. The information may be transmitted to a remote system by a long-range radio communication means.

If the gas cylinder and its appliances or accessories may be dissociated (cf. in particular the second tap 5 which may be transferred from one cylinder 2 to another), the system is capable of recovering one or more items of information from a remote element (via wireless communication), such as: identification data, position data, data derived from measurements, states, etc. These data, once they have been collected by a central system, may be pre-processed and then transmitted to a remote system.

The system is preferably also capable of receiving information or requests originating from a remote appliance. For example, a request to adjust or to lock a gas cylinder 2, a new parameter to configure the system (tap 5, etc.), a request regarding the state, status or geographical position of the appliance, etc., may be transmitted.

To find a cylinder or a tap 5, it is also possible to provide a radio guidance system in order to reach an appliance being sought. This guidance may be performed using numerous methods, such as 'RSSI', 'AoA', 'LoS', 'TDoA', 'ToF', 'TWF', 'SDS-TWR' or NFER®, and using an associated algorithm (trilateration, triangulation, multilateration, etc.).

To this end, the system may be supplemented by an accelerometer or magnetometer (for example at the telephone 14 or box 15), in order to improve the effectiveness and the accuracy of the guidance system. Specifically, using one or more accelerometers on the appliances enables knowledge of the direction of movement of the user or the appliance being sought. By correlating this information with the variations in the signal (Bluetooth and/or long range), this may give an item of distance information. It is then possible to point the user in the direction of the appliance 2, 5 being sought. Using a magnetometer may make it possible to further increase the level of information by giving an item of geographical orientation information (heading in degrees).

It is likewise possible to improve the service by pooling the geolocation systems with the radio guidance system so as to be able to geolocate and then reach the system(s) being sought. It is possible to use a portable terminal (for example a smartphone) in order to position the appliance being sought on an interactive map (via an integrated screen) and then to physically reach the appliance using the guidance system.

The device described above thus makes it possible to manage the modular elements of one or more gas transfer devices. In particular, the device makes it possible to manage the exchanges between one or more first assemblies (including a cylinder 2) and one or more second taps 5 that are able to be selectively connected.

The device makes it possible to recognize the cylinder 2 automatically by the second tap 5 (and vice versa) in order to ensure, as the case may be, traceability and/or compatibility of the connections and uses.

This enables better management of a fleet of cylinders and associated taps. This may be used in particular to provide services such as stock management assistance, automatic ordering of hardware and of gas, providing of safety data, etc.

If the first 3 and/or the second 5 tap is equipped with a pressure sensor measuring the pressure in the cylinder 2, this information may be transmitted and/or displayed and/or used to calculate autonomy or gas consumption via processing electronics (for example the electronic data processing logic system 12 comprising at least one microprocessor or any other suitable system), in order to generate an alert (for example to signal that the cylinder is almost empty).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A device for supplying pressurized fluid, comprising:
a pressurized fluid cylinder comprising:
at least one first tap connected to the pressurized fluid cylinder, the tap comprising an internal fluid circuit including an isolation valve,
the device comprising an electronic apparatus for the wireless remote communication of data via electromagnetic waves,
the electronic communication apparatus comprising a communication element configured to communicate wirelessly using at least one of the following frequency-modulation and/or phase-modulation low-consumption and long-range communication technologies:
LoRa communication technology,
communication technology from Sigfox,
wherein the device comprises a protective cap mounted on the cylinder in order to protect the first tap and a second tap connected detachably to the first tap, and said electronic communication apparatus being situated either on the cylinder, on the cap, on the first tap, or on the second tap,
wherein the electronic communication apparatus comprises at least one first communication element configured to communicate wirelessly using 'near-field communication' ('NFC') technology and positioned on one of the following:
the cylinder,
the cap,
the first tap,
the device comprising a second communication element configured to communicate wirelessly using 'near-field communication' ('NFC') technology and positioned on a first lower end of the second tap and placed adjacent to the first communication element ('NFC') when the second tap is connected to the first tap so as to enable a data exchange.

2. The device of claim 1, wherein the LoRa communication technology uses frequency hopping spread spectrum frequency modulation enabling in particular the recovery of transmitted data even when they are received with a signal-to-noise ratio of less than 0 dB, operating on set frequency bands.

3. The device of claim 2, wherein the set frequency bands are between 433.0 and 434.79 MHz.

4. The device of claim 2, wherein the set frequency bands are between 863 and 870 MHz.

5. The device of claim 2, wherein the set frequency bands are between 902 and 928 MHz.

6. The device of claim 2, wherein the set frequency bands are between 2400 and 2500 MHz.

7. The device of claim 6, wherein the set frequency bands are between 433.0 and 434.79 MHz.

8. The device of claim 6, wherein the set frequency bands are between 863 and 870 MHz.

9. The device of claim 6, wherein the set frequency bands are between 902 and 928 MHz.

10. The device of claim 6, wherein the set frequency bands are between 2400 and 2500 MHz.

11. The device of claim 10, wherein the electronic data reception element is configured to determine the position of the electronic communication apparatus using at least one of the following technologies: trilateration, triangulation, multilateration.

12. The device of claim 11, wherein the electronic communication apparatus comprises at least one communication element configured to communicate wirelessly using 'Bluetooth' technology.

13. The device of claim 12, wherein the transceiver box is configured to receive data transmitted using 'Bluetooth' technology via the telephone and to convert and transfer these data to the communication element using low-consumption and long-range communication technology.

14. The device of claim 12, wherein that the telephone and/or the receiver box comprises an accelerometer and/or a magnetometer.

15. The device of claim 1, wherein the communication technology from Sigfox uses ultra-narrow band (UNB) frequency modulation or phase modulation synthesizing frequency modulation, making it possible to obtain a high power spectral density in order to increase the signal-to-noise ratio, operating on set frequency bands.

16. The device of claim 1, further comprising at least one electronic element for receiving the data transmitted wirelessly by the electronic communication apparatus, the electronic reception element being configured to determine the position of the electronic communication apparatus on the basis of the data transmitted wirelessly by the latter.

17. The device of claim 1, wherein the at least one electronic data reception element comprises at least one of the following: an antenna connected to a communication network, a cloud communication network comprising at least one server, and a cordless telephone.

18. The device as of claim 17, wherein the at least one electronic data reception element comprises a cordless telephone configured to communicate using 'Bluetooth' technology and an electronic box for wirelessly receiving and transmitting data and configured to communicate using 'Bluetooth' technology and in accordance with the LoRa® communication protocol and/or via the ultra-narrow frequency band communication network developed by Sigfox, and wherein the transceiver box is configured to receive data transmitted by the communication element using low-consumption and long-range communication technology and to convert and transfer these data to the telephone using 'Bluetooth' technology.

19. A device for supplying pressurized fluid, comprising:
a pressurized fluid cylinder comprising:
at least one first tap connected to the pressurized fluid cylinder, the tap comprising an internal fluid circuit including an isolation valve,
the device comprising an electronic apparatus for the wireless remote communication of data via electromagnetic waves,
the electronic communication apparatus comprising a communication element configured to communicate wirelessly using at least one of the following frequency-modulation and/or phase-modulation low-consumption and long-range communication technologies:
LoRa communication technology,
communication technology from Sigfox,
wherein the device comprises a protective cap mounted on the cylinder in order to protect the first tap and a second tap connected detachably to the first tap, and said electronic communication apparatus being situated either on the cylinder, on the cap, on the first tap, or on the second tap,
wherein the electronic communication apparatus comprises at least one communication element configured to communicate wirelessly using 'near-field communication' ('NFC') technology and/or using 'radiofrequency identification' ('RFID') technology, and
wherein the electronic communication apparatus comprises a third communication element configured to communicate wirelessly using 'near-field communication' ('NFC') technology and positioned on a second end of the second tap, which end is situated at the upper part of the second tap when the latter is connected to the first tap and the cylinder is in a vertical use position.

* * * * *